United States Patent
Torrez

(10) Patent No.: US 6,260,631 B1
(45) Date of Patent: Jul. 17, 2001

(54) MANUAL EMBEDDING TOOL

(76) Inventor: Narciso Q. Torrez, 23116 N. Drifter Way, Sun City West, AZ (US) 85375

(*) Notice: Subject to any disclaimer, the term of this patent is extended or adjusted under 35 U.S.C. 154(b) by 0 days.

(21) Appl. No.: 09/693,167

(22) Filed: Oct. 23, 2000

(51) Int. Cl.$^7$ .................................................. A01B 1/00
(52) U.S. Cl. .............................................. 172/371; D8/11
(58) Field of Search ..................... 172/371, 375, 172/376, 377, 381, 41; D8/10, 11, 12, 7, 1

(56) References Cited

U.S. PATENT DOCUMENTS

| | | |
|---|---|---|
| 3,804,450 | 4/1974 | Guenzel . |
| 4,565,398 | 1/1986 | Poulin . |
| 5,103,520 | 4/1992 | Mazzo . |
| 5,695,011 | 12/1997 | Daniels . |
| 5,752,285 | 5/1998 | Bendheim et al. . |
| 5,765,648 | 6/1998 | Sheehan et al. . |

*Primary Examiner*—Christopher J. Novosad
(74) *Attorney, Agent, or Firm*—Robert Ryan Morishita; Anderson & Morishita

(57) ABSTRACT

The present invention is that of a innovative tool for use in a garden or on tilled earth. The present invention would allow a user to furrow into the dirt or ground, while at the same time, laying a length of tubing, electrical wire, hose, or cable into the bottom of the furrow as the blade would be pulled along. The present invention would have a comfortably angled handle with an incorporated channel running from the top of the handle to the rear of the blade assembly, allowing a small diameter tube or cable to feed through the present invention and into the newly formed furrow as the present invention would be pulled along the ground. The front edge of the blade assembly of the present invention would be tapered and have a sharp point to assist with cutting through loose dirt and/or gravel, and the handle would be knurled to prevent a user's hand from slipping while using the present invention. The present invention would also include a holding stake, which would be used to secure a first end of the tubing, wire, hose, or cable at the beginning of the insertion process.

2 Claims, 3 Drawing Sheets

MANUAL EMBEDDING TOOL

I. BACKGROUND OF THE INVENTION

The present invention relates to that of a new and improved garden tool, and specifically relates to a tool which would allow a user to plow a furrow into the ground, while at the same time, laying a length of tubing, electrical wire, hose, or cable.

II. DESCRIPTION OF THE PRIOR ART

U.S. Pat. No. 5,765,648, issued to Sheehan et al., discloses a multipurpose garden tool and method for indoor or outdoor gardening, planting, and soil working.

U.S. Pat. No. 5,752,285, issued to Bendheim et al., discloses a hand-held, multipurpose implement including a handle provided with a resealable storage container and an adapter head having at least a pair of insert receiving sockets.

U.S. Pat. No. 5,695,011, issued to Daniels, discloses a multipurpose worksaving and ergonomically designed gardening tool useful for transplanting seedlings and other gardening tasks.

U.S. Pat. No. 5,103,520, issued to Mazzo, discloses a multi-purpose tool, partly foldable, useful as a hammer/pick, probe/ruler, knife/saw, spade/trowel, and even as a bottle opener.

U.S. Pat. No. 4,565,398, issued to Poulin, discloses a compound type or agricultural tool having a handle which is adapted to be fitted to a blade type of implement which is angularly adjustable for use as a spade, shovel, or hoe and a fork type implement which is similarly adjustable.

U.S. Pat. No. 3,804,450, issued to Guenzel, discloses a multipurpose yard and gardening hand tool having a flat bottomed spade or scoop member and an elongated multiple grip handle having a pointed end.

III. SUMMARY OF THE INVENTION

The present invention is that of an innovative tool for use in a garden or on tilled earth. The present invention would allow a user to furrow into the dirt or ground, while at the same time, laying a length of tubing, electrical wire, hose, or cable into the bottom of the furrow as the blade would be pulled along. The present invention would have a comfortably angled handle with an incorporated channel running from the top of the handle to the rear of the blade assembly, allowing a small diameter tube or cable to feed through the present invention and into the newly formed furrow as the present invention would be pulled along the ground. The front edge of the blade assembly of the present invention would be tapered and have a sharp point to assist with cutting through loose dirt and/or gravel, and the handle would be knurled to prevent a user's hand from slipping while using the present invention.

The present invention would also include a holding stake, which would be used to secure an end of the tubing, wire, hose, or cable at the beginning of the insertion process. Use of the present invention would provide a means for quickly and easily installing a small diameter tube, wire, hose, or cable into the ground without the need to dig a large ditch. The present invention would allow a user to effectively place a length of tubing, wire, hose, or cable at a uniform depth with very little damage to the cable while creating a minimal disturbance to the surface of the ground.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regard as including such equivalent constructions insofar as they do not depart from the spirit and scope of the present invention.

It is therefore an object of the present invention to provide a new and improved tubing or cable installing apparatus which has all of the advantages of the prior art installing apparatus and none of the disadvantages.

It is another object of the present invention to provide a new and improved tubing or cable installing apparatus which may be easily and efficiently manufactured and marketed.

It is another object of the present invention to provide a new and improved tubing or cable installing apparatus which is of durable and reliable construction.

It is yet another object of the present invention to provide a new and improved tubing or cable installing apparatus which is economically affordable and available to the buying public.

It is still yet another object of the present invention to provide a new and improved tubing or cable installing apparatus which is lightweight and easy to use.

It is yet another object of the present invention to provide a new and improved tubing or cable installing apparatus which causes minimum damage and disruption to the ground while being used.

Other objects, features and advantages of the present invention will become more readily apparent from the following detailed description of the preferred embodiment when considered with the attached drawings and appended claims.

IV. BRIEF DESCRIPTION OF THE DRAWINGS

V. DESCRIPTION OF THE PREFERRED EMBODIMENT

Figure 1:
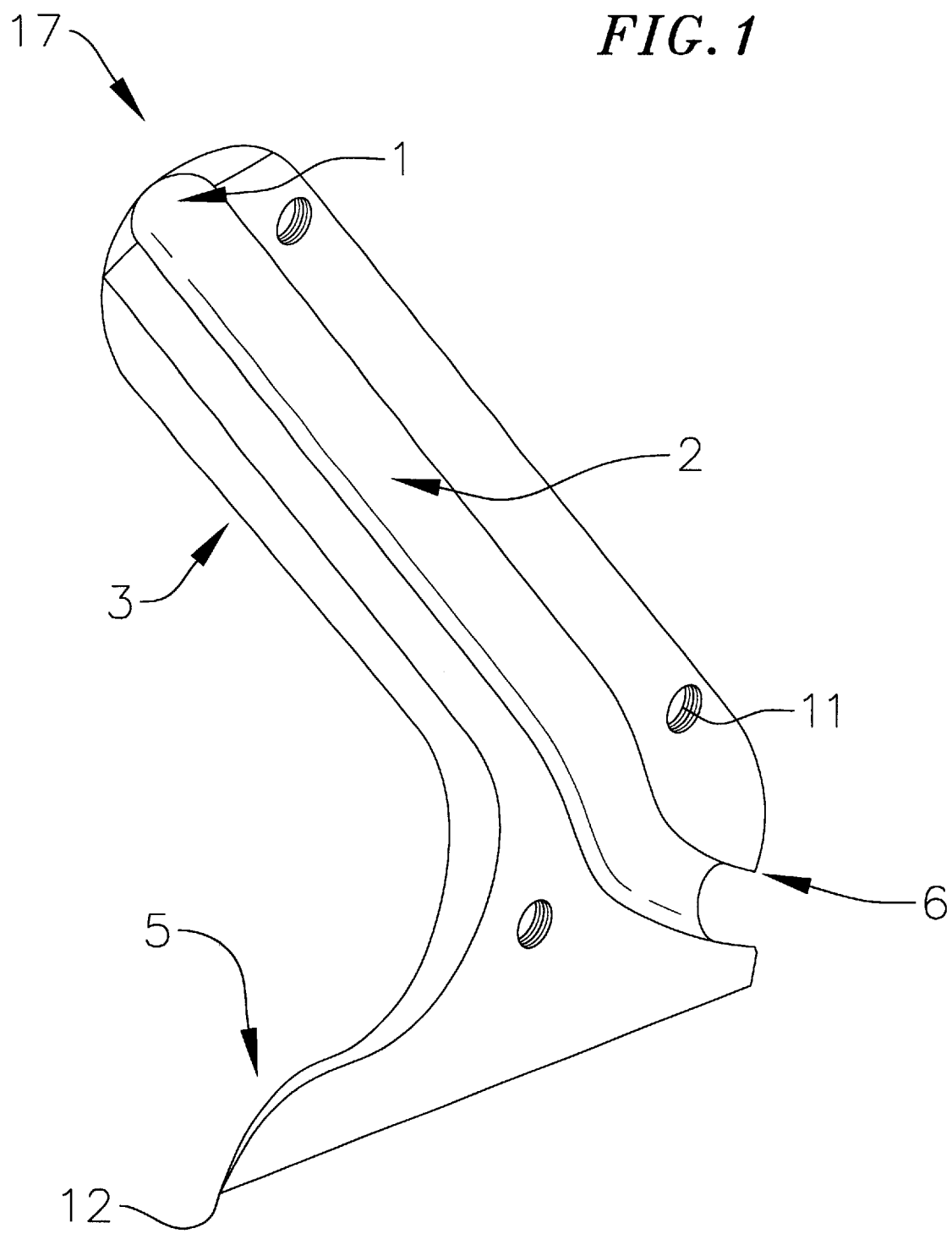
FIG. 1 shows a perspective view of the left half of the present invention.

FIG. 1 shows a perspective view of left half 17 of manual embedding tool 16 of the present invention. Left half 17 and right half 18 are mirror images of one another, and explaining the present invention by showing a perspective view of left half 17 would help enable a user to understand the present invention when left half 17 and right half 18 are attached to one another.

Left half 17 has two ends, a first end and a second end. The first end of left half 17 has an angled knurled handle 3 which extends upward at approximately a forty-five degree angle. When left half 17 and right half 18 are placed together, knurled handle 3 would be in the shape of a circular tube. The second end of left half 17 has bottom-mounted blade 5. Blade 5 has two ends, a first end and a second end. The first end of blade 5, which would be located under a portion of knurled handle 3 and would extend toward a user, would include tapered point 12. Tapered point 12 would assist a user while using the present invention when the user would be cutting through loose dirt and ground while pulling the present invention toward the user.

Left half 17 also has incorporated line feed channel half 2, which has two ends, a first end and a second end. The first end of line feed channel half 2 starts at the first end of left half 17 of manual embedding tool 16. The second end of line feed channel half 2 ends at outlet 6, which is located near the second end of left half 17 immediately above the second end of blade 5. Line feed channel half 2 is half of a round channel, and when left half 17 is fixably attached to right half 18, would combine with the line feed channel half 10 on right half 18 to form a tunnel through manual embedding tool 16, which would allow tubing, wiring, hose, or cable to be fed through the tunnel so as to exit through outlet 6 as the present invention would be pulled through the ground. Outlet 6 would be a full radius orifice located near the second end of blade 5, and would ensure that tubing, cable, or other relevant material running through manual embedding tool 16 would smoothly exit the present invention without damage.

Left half 17 also has a plurality of screw holes 11. When left half 17 is mated with right half 18, right half 18 also has a plurality of screw holes 11 which would match up with the location of the plurality of screw holes 11 located on left half 17, allowing a user to fixably secure left half 17 and right half 18 together with a plurality of screws 4. The plurality of screws 4 and the plurality of screw holes 11 would have threads so as to ensure a tight and secure fit once left half 17 would be attached to right half 18.

Figure 2:
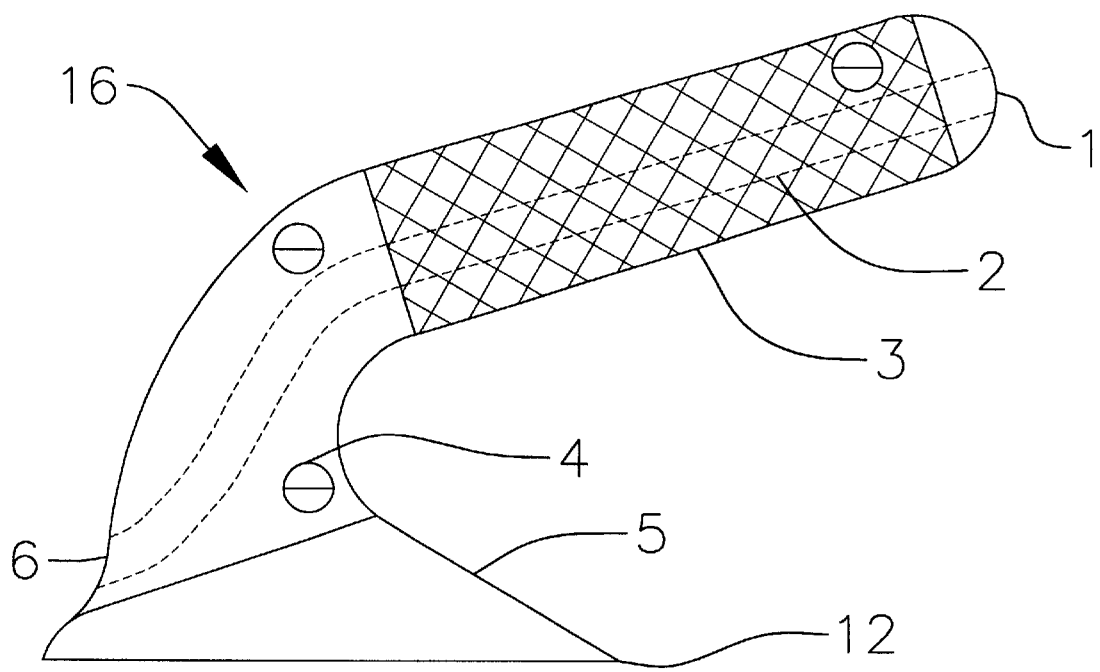
FIG. 2 shows a side view of the present invention.
Figure 3:
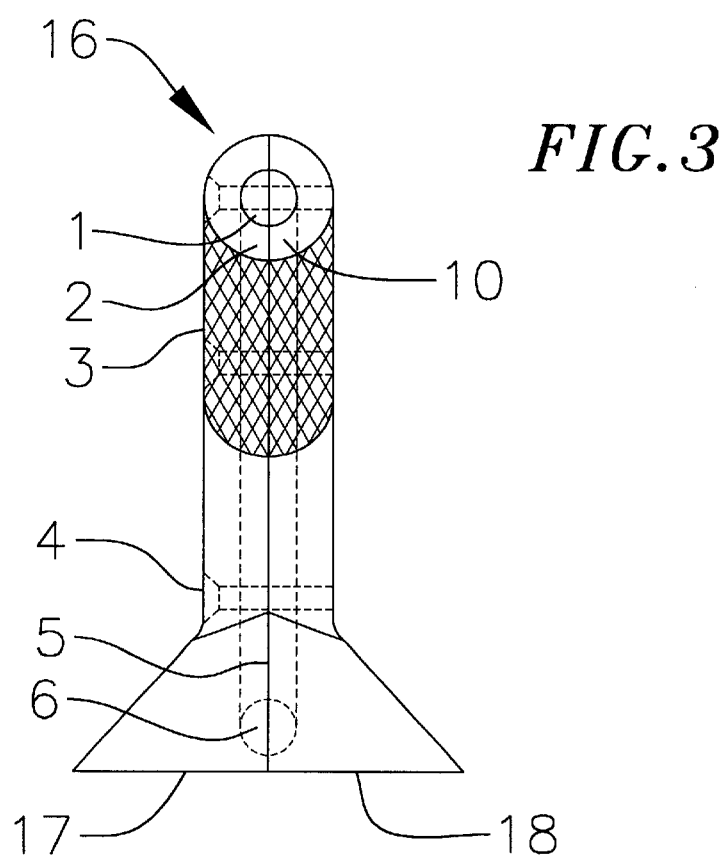
FIG. 3 shows a rear view of the present invention.

FIGS. 2 and 3 show side and rear views, respectively, of manual embedding tool 16. As can be seen, line feed channel half 2 and line feed channel half 10 form a circular tunnel which travels entirely through the present invention from the first end of knurled handle 3 to approximately near the second end of blade 5. A user would grab knurled handle 3 and pull the present invention toward them so that tapered point 12 on blade 5 would easily and efficiently loosen the dirt and/or ground in an effort to make way for a cable or tubing.

Figure 4:
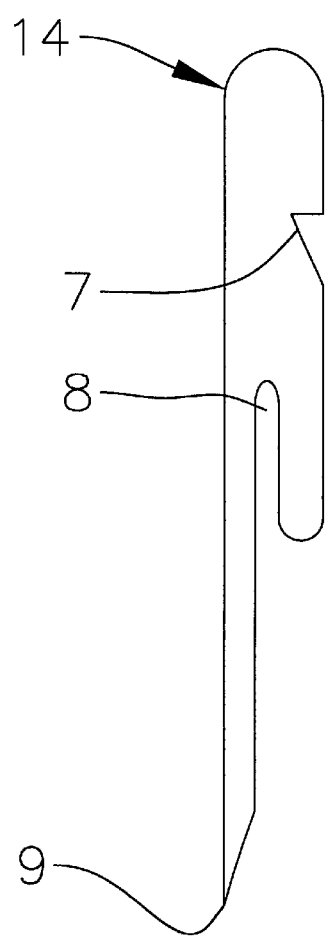
FIG. 4 shows a front view of the holding stake of the present invention.

FIG. 4 shows a front view of holding stake 14 that would be used with the present invention. Holding stake 14 has two ends, a first end and a second end. The second end of holding stake 14 terminates in point 9, which would allow the stake to be effectively and easily placed into the ground in an effort to provide leverage for cable or tubing that would be placed into the ground.

Holding stake 14 also has groove 8, which a user can insert a length of tubing and/or cable into. By inserting a length of tubing and/or cable into groove 8 of holding stake 14, a user would provide an effective anchoring mechanism so that he or she could begin using manual embedding tool 16 to lay a length of cable and/or tubing. Once a user had placed the desired length of tubing and/or cable into the ground, a user could use a claw hammer or other related tool to pull up stake 14, thereby providing force which would pull holding stake out of the ground. Notch 7 would be a notch located on holding stake 14 near the first end of holding stake 14.

Figure 5:
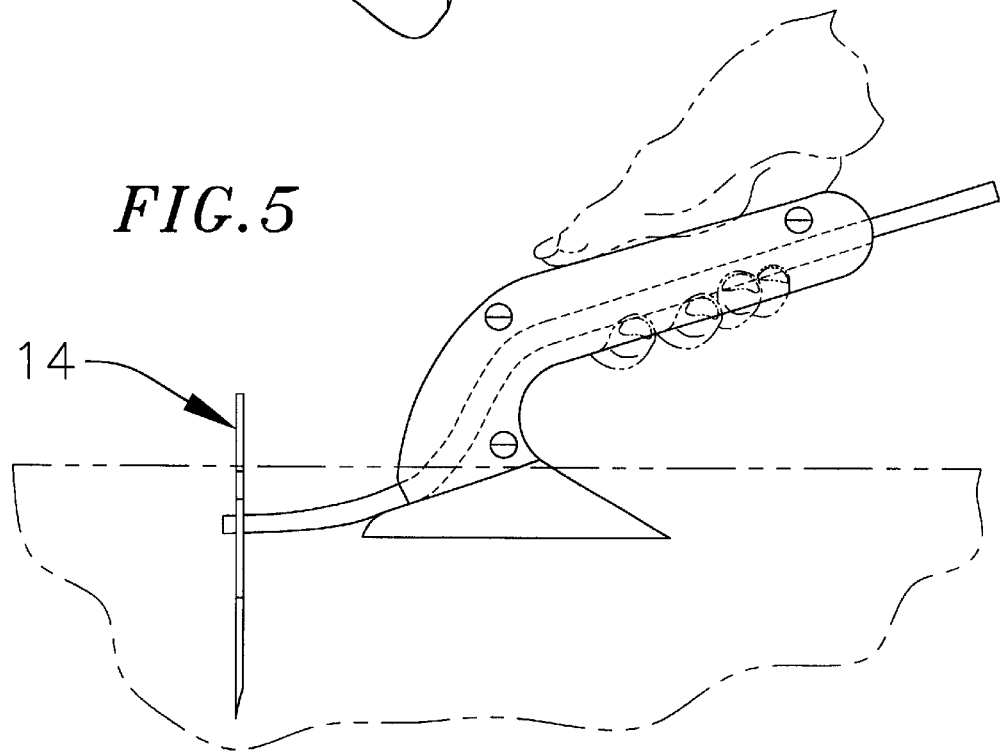
FIG. 5 shows a perspective view of the present invention in use.

FIG. 5 shows a perspective view of the present invention in use. As can be seen, a length of tubing has been placed through the tunnel created by the mating of line feed channel half 2 and line feed channel half 10. The first end of the tubing has been inserted into groove 8 of holding stake 14. A user is slowly pulling manual embedding tool 16 toward him or her, which allows the length of tubing to snake through the tunnel of the present invention and be effectively placed into the furrow that is created by tapered point 12 on blade 5. Once the user has laid the appropriate amount of cable and/or tubing, the cable or tubing would be cut, and any disruption in the ground and/or dirt would be patted down. At that time, a user could use a claw hammer or other related tool to pull up stake 14, thereby providing force which would pull holding stake 14 out of the ground.

What I claim as my invention is:

1. An embedding tool, the embedding tool comprising:

a. a mid section, the mid section having two ends, a first end and a second end, the mid section also having two surfaces, a front surface and a rear surface, the front surface being a concave surface, the rear surface being a convex surface, b. a knurled handle, the knurled handle having two ends, a first end and a second end, the first end of the knurled handle being attached to the first end of the mid section, the knurled handle extending from the mid section at an angle, with the angle being approximately 30 to 45 degrees, the second end of the knurled handle culminating in a rounded cap, c. a blade, the blade having two points, a tapered point and a rear point, the blade having two edges, a top edge and a bottom edge, the top edge of the blade being fixably connected to the second end of the mid section, the tapered point of the blade extending away from the mid section in such a manner that the tapered point extends outward in the same plane as the knurled handle approximately 30 to 45 degrees from the knurled handle, d. a line feed tunnel, the line feed tunnel having two ends, a first end and a second end, the line feed tunnel being a continuous circular tunnel, the line feed tunnel being located within the knurled handle and mid section, the first end of the line feed tunnel being located on the center of the rounded cap located on the second end of the knurled handle, the second end of the line feed tunnel being located on the rear surface of the mid section, and e. an embedding means for laying a length of tubing, electrical wire, hose, or cable into the ground.

2. An embedding means for laying a length of tubing, electrical wire, hose, or cable into the ground according to claim 1, wherein the embedding means further comprises:

a. a holding stake, the holding stake having two ends, a first end and a second end, the second end terminating in a point, the holding stake including a groove, b. a length of tubing, electrical wire, hose, or cable, the length having a first end and a second end, the first end being attachable, the second end being attached to a stationary or rotatable source, c. whereby a user would implant the holding stake into the ground; extend the first end of the length through the first end of the line feed tunnel, out the second end of the line feed tunnel, and attach the first end of the length to the grove on the holding stake; place the blade of the embedding tool into the ground, with the tapered point pointing toward the user; pull the embedding tool toward himself or herself, causing the length to enter the first end of the line feed tunnel and exit the second end of the line feed tunnel, thereby being placed in a ground furrow at a specific depth created by the blade on the embedding tool; and cut the length once a desired length of tubing, electrical wire, hose, or cable has been placed into the ground furrow created by the tapered point of the blade of the embedding tool.

\* \* \* \* \*